(12) United States Patent
Lv et al.

(10) Patent No.: US 12,435,246 B2
(45) Date of Patent: Oct. 7, 2025

(54) MATTE FLAME RETARDANT LABEL

(71) Applicant: Avery Dennison Corporation, Mentor, OH (US)

(72) Inventors: Zhongfei Lv, Kunshan (CN); Yurun Yang, Shanghai (CN); Shuhui Xie, Kunshan (CN); Biao Shen, Shanghai (CN); Yu Wang, Suzhou Industrial Park (CN); Fuhai Zhou, Kunshan (CN)

(73) Assignee: Avery Dennison Corporation, Mentor, OH (US)

( * ) Notice: Subject to any disclaimer, the term of this patent is extended or adjusted under 35 U.S.C. 154(b) by 409 days.

(21) Appl. No.: 17/427,136

(22) PCT Filed: Feb. 2, 2019

(86) PCT No.: PCT/CN2019/074558
§ 371 (c)(1),
(2) Date: Jul. 30, 2021

(87) PCT Pub. No.: WO2020/155139
PCT Pub. Date: Aug. 6, 2020

(65) Prior Publication Data
US 2022/0098447 A1    Mar. 31, 2022

(51) Int. Cl.
*C09J 7/38*    (2018.01)
*C09J 7/29*    (2018.01)
(Continued)

(52) U.S. Cl.
CPC . *C09J 7/38* (2018.01); *C09J 7/29* (2018.01); *G09F 3/02* (2013.01); *G09F 3/10* (2013.01);
(Continued)

(58) Field of Classification Search
CPC ... C09J 7/38; C09J 7/29; C09J 2301/41; C09J 2400/283; C09J 2433/006; C09J 2467/006;
(Continued)

(56) References Cited

U.S. PATENT DOCUMENTS 5,780,534 A    7/1998    Kleiner et al.
6,203,885 B1   3/2001    Sher et al.
(Continued)

FOREIGN PATENT DOCUMENTS

CN    102131640    7/2011
CN    102695766    9/2012
(Continued)

OTHER PUBLICATIONS

International Preliminary Report on Patentability dated Aug. 12, 2021 issued in corresponding IA No. PCT/CN2019/074558 filed Feb. 2, 2019.
(Continued)

*Primary Examiner* — Patricia L. Nordmeyer

(57) ABSTRACT

Provided herein is a flame retardant label suitable for labeling electrical devices. The disclose label includes a coating layer, a film layer, an adhesive layer, and, optionally, a liner layer. The coating layer and the adhesive layer may include flame retardants. The flame retardant label may also include channels that provide for air egress during application of the label.

32 Claims, 2 Drawing Sheets

(51) Int. Cl.
*G09F 3/02* (2006.01)
*G09F 3/10* (2006.01)
*H01M 50/143* (2021.01)

(52) U.S. Cl.
CPC ....... *H01M 50/143* (2021.01); *B32B 2255/26* (2013.01); *B32B 2307/3065* (2013.01); *B32B 2457/10* (2013.01); *C09J 2301/41* (2020.08); *C09J 2400/283* (2013.01); *C09J 2433/006* (2013.01); *C09J 2467/006* (2013.01); *C09J 2475/006* (2013.01); *G09F 2003/0225* (2013.01); *G09F 2003/0232* (2013.01); *G09F 2003/0257* (2013.01)

(58) Field of Classification Search
CPC ........ C09J 2475/006; G09F 3/02; G09F 3/10; G09F 2003/0225; G09F 2003/0232; G09F 2003/0257; G09F 23/0058; H01M 50/143; B32B 2255/26; B32B 2307/3065; B32B 2457/10; B32B 33/00; Y02E 60/10
See application file for complete search history.

(56) References Cited

U.S. PATENT DOCUMENTS

| | | |
|---|---|---|
| 6,524,649 B1 | 2/2003 | Sher et al. |
| 6,582,789 B1 | 6/2003 | Sumi |
| 6,656,567 B1 | 12/2003 | Abe et al. |
| 6,759,110 B1 | 7/2004 | Fleming et al. |
| 6,803,072 B2 | 10/2004 | Sher et al. |
| 6,838,142 B2 | 1/2005 | Yang et al. |
| 6,858,285 B1 | 2/2005 | Hamilton et al. |
| 7,087,279 B2 | 8/2006 | Callahan et al. |
| 7,332,206 B2 | 2/2008 | Callahan et al. |
| 7,338,693 B2 | 3/2008 | Shikano et al. |
| 7,790,790 B2 | 9/2010 | Karayianni et al. |
| 7,867,601 B2 | 1/2011 | Ikishima et al. |
| 8,101,884 B2 | 1/2012 | Kato et al. |
| 8,313,822 B2 | 11/2012 | Hatakenaka |
| 8,323,773 B2 | 12/2012 | Flanigan et al. |
| 8,440,288 B2 | 5/2013 | Kanda |
| 8,658,285 B2 | 2/2014 | Hinton et al. |
| 8,920,905 B2 | 12/2014 | Sauter et al. |
| 8,980,399 B2 | 3/2015 | Morioka et al. |
| 9,133,368 B2 | 9/2015 | Tomino |
| 9,353,294 B2 | 5/2016 | Fleming et al. |
| 9,376,598 B2 | 6/2016 | Kanda |
| 9,422,460 B2 | 8/2016 | Yoo et al. |
| 9,555,602 B2 | 1/2017 | Sherman et al. |
| 9,631,123 B2 | 4/2017 | Aoyama et al. |
| 9,676,967 B2 | 6/2017 | Ebenau et al. |
| 9,911,367 B2 | 3/2018 | Lux et al. |
| 10,360,823 B2 | 7/2019 | Iwasawa et al. |
| 2005/0181164 A1 | 8/2005 | Plumarta et al. |
| 2006/0020064 A1 | 1/2006 | Bauer et al. |
| 2006/0051551 A1 | 3/2006 | Shikano et al. |
| 2006/0172104 A1 | 8/2006 | Lim et al. |
| 2007/0054093 A1 | 3/2007 | Sakurai et al. |
| 2007/0158259 A1 | 7/2007 | Ludwig |
| 2007/0166510 A1 | 7/2007 | Kato et al. |
| 2007/0218269 A1 | 9/2007 | Kato et al. |
| 2007/0254136 A1 | 11/2007 | Kato et al. |
| 2008/0014407 A1 | 1/2008 | Katoh et al. |
| 2008/0032118 A1 | 2/2008 | Kato et al. |
| 2008/0241529 A1 | 10/2008 | Bauer et al. |
| 2009/0053467 A1 | 2/2009 | Kato et al. |
| 2009/0136711 A1 | 5/2009 | Tomino et al. |
| 2010/0092730 A1 | 4/2010 | Tomino et al. |
| 2010/0209671 A1 | 8/2010 | Kato |
| 2011/0014411 A1 | 1/2011 | Hagiwara et al. |
| 2012/0164442 A1 | 6/2012 | Ong et al. |
| 2012/0222805 A1 | 9/2012 | Shintani et al. |
| 2013/0260992 A1 | 10/2013 | Nahm |
| 2014/0248458 A1 | 9/2014 | Sherman et al. |
| 2015/0017373 A1 | 1/2015 | Aoyama et al. |
| 2015/0275050 A1 | 10/2015 | Wei-Cheng et al. |
| 2015/0321407 A1 | 11/2015 | Dooley et al. |
| 2016/0194466 A1 | 7/2016 | Nakamura et al. |
| 2017/0009108 A1 | 1/2017 | Mitchell et al. |
| 2017/0044404 A1 | 2/2017 | Yamamoto et al. |
| 2017/0073550 A1 | 3/2017 | Barrios et al. |
| 2017/0080677 A1 | 3/2017 | Wada et al. |
| 2017/0080697 A1 | 3/2017 | Wada et al. |
| 2017/0080698 A1 | 3/2017 | Wada et al. |
| 2017/0137671 A1 | 5/2017 | Ogomi et al. |
| 2017/0144362 A1 | 5/2017 | Nakayama et al. |
| 2017/0198168 A1 | 7/2017 | Baetzold et al. |
| 2017/0204295 A1 | 7/2017 | Pillalamarri et al. |
| 2018/0072922 A1 | 3/2018 | Canale |
| 2018/0350271 A1 | 12/2018 | Schmitt et al. |
| 2018/0362809 A1 | 12/2018 | Xie et al. |

FOREIGN PATENT DOCUMENTS

| | | | |
|---|---|---|---|
| CN | 203982691 U | 12/2014 | |
| CN | 105980153 | 9/2016 | |
| CN | 106437072 | 2/2017 | |
| CN | 106575491 | 4/2017 | |
| CN | 107310229 | 11/2017 | |
| CN | 107474751 | 12/2017 | |
| CN | 107849407 | 3/2018 | |
| CN | 108182869 | 6/2018 | |
| CN | 108510874 | 9/2018 | |
| CN | 108538188 | 9/2018 | |
| EP | 1444143 | 5/2008 | |
| EP | 2256167 | 8/2018 | |
| JP | 2016-117854 | 6/2016 | |
| WO | WO-2010132176 A2 * | 11/2010 | ............. C08G 71/02 |
| WO | WO-2011029225 A1 * | 3/2011 | ............. B32B 15/08 |
| WO | 2012/090732 | 7/2012 | |
| WO | 2018/157282 | 9/2018 | |
| WO | 2020/155153 | 8/2020 | |

OTHER PUBLICATIONS

International Search Report and Written Opinion dated Oct. 31, 2019 issued in corresponding IA No. PCT/CN2019/074558 filled Feb. 2, 2019.

* cited by examiner

MATTE FLAME RETARDANT LABEL

CROSS-REFERENCE TO RELATED APPLICATION

The present application is a 371 of International Application No. PCT/CN2019/074558, which was published in English on Aug. 6, 2020, which is incorporated herein by reference in its entirety.

FIELD

The present disclosure relates generally to flame retardant labels. These labels are useful for labeling electrical equipment, e.g. batteries.

BACKGROUND

Labels that are flame retardant are desired for many situations, including labeling electrical equipment, e.g., a lithium ion battery. Electrical equipment may develop an increased risk of fire hazard, e.g., due to extended periods of use or operation thereof, so labels and the components thereof with flame retardant capabilities are desired. To be fully utilized with electrical equipment, labels also require good printability and good adhesion performance. The adhesion performance is typically measured by tack strength, shear, and/or 180° peel strength. Furthermore, labels must also have appropriate size and thickness, so that the labels can be easily wrapped around a given substrate. Further, the amounts of components present in the various layers of the labels must be controlled such that production of the labels remains cost effective.

Conventionally, labels having flame retardant properties are produced by stacking multiple layers of fire-retardant coating, film, and adhesives. The coating layer of some conventional labels often comprise polymeric resins that lack sufficient thermal decomposition resistance e.g., having a low char yield. Char yield for polymers is defined as the amount of solid residue at 930° C. in a nitrogen atmosphere and in general, a higher char yield is associated with a higher thermal decomposition resistance and a higher flame retardant capabilities. In some cases, flame retardants may be added to a topcoat to improve the flame retardant properties thereof. However, flame retardants added to the label often compromise the label's adhesion performance. Thus, in order to compensate for the problems caused by flame retardants, manufacturers often increase the amount of other constituents of different layer that contribute to the adhesion performance of the label and increase the thickness of the label. Unfortunately, these adjustments typically cause increases in production costs and inconveniences in label application. Also, the resultant labels may often be too thick for the intended purpose.

Conventional labels are also especially prone to the entrapment of air bubbles during application. For example, when a label is applied to a substrate, e.g., a piece of electrical equipment, pockets of air may be caught between the label and the substrate, and an immovable bubble may form if the air pocket becomes completely surrounded by the label. Air bubbles trapped by labels may be unsightly and may distort an image or text printed on the opposite surface of the label. Furthermore, air bubbles may interfere with structural designs. For example, a labeled piece of electrical equipment might be unable to fit securely in an intended position if a trapped air bubble artificially increases the surface area and/or volume of the labeled equipment. As regards flame retardant labels in particular, an air bubble creates a portion of the labeled substrate without adequate flame retardant capability. The air bubble may therefore give rise to an increased risk of fire hazard, thereby vitiating the intended activity of the flame retardant label.

Even in view of the conventional labels, the need exists for a cost-effective label having effective and stable flame retardant properties and at the same time having appropriate thickness as well as good adhesion, converting, and/or reposition performance. In particular, the need exists for a label with these features and that also allows for the egress of air, such that bubbles do not form during application.

SUMMARY

In one embodiment, the invention relates to a flame retardant label, comprising a coating layer, comprising a first base polymer, a first crosslinker, and a first flame retardant agent; a film layer; and an adhesive layer, comprising a second base polymer, a second flame retardant agent, a tackifier, and a second crosslinker. In some embodiments, the adhesive layer is in contact with at least a portion of the film layer. In some embodiments, each of the coating layer, the film layer, and the adhesive layer comprises a top surface and a bottom surface. In some embodiments, the adhesive layer defines channels for air egress. In some cases, the channels may be arranged as tessellating rhombuses. In some embodiments, the flame retardant label has a haze value from 5 to 80.

In some embodiments, the first base polymer comprises a polyester, polyacrylate, or combinations thereof. The coating layers may comprise a polyester, polyacrylate, or combinations thereof in amounts ranging from 20 wt. %. to 60 wt. %. The first base polymer may have a hydroxyl value greater than 100 mgKOH/g. In some embodiments, the second base polymer comprises a polyester, polyacrylate, or combinations thereof. The second base polymer may have a hydroxyl value less than 100 mgKOH/g. The second base polymer may have an acid value less than 100 mgKOH/g. In some embodiments, the second base polymer has a glass transition temperature ranging from −50° C. to 10° C. In some embodiments, the weight ratio of the tackifier in the adhesive layer to the second base polymer is from 1:10 to 1.5:1. In some embodiments, the first crosslinker comprises isocyanate. In some embodiments, the first flame retardant agent comprises organic phosphinates. In some embodiments, the second flame retardant agent comprises organic phosphinates. In some embodiments, the tackifier in the adhesive layer comprises a rosin, a terpene, or derivatives thereof, or combinations thereof. The tackifier in the adhesive layer may have an average softening point below 125° C. In some embodiments, the second crosslinker comprises isocyanate, epoxy, or combinations thereof. In some embodiments, the film layer comprises one or more resins selected from the group consisting of polyester, ABS, polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PEI), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, DIALAMY (polymer alloys), polyethylene naphthalate (PEN), ethylene/tetrafluoroethylene (E/TFE), polyphenyl sulfone (PPSU). In some embodiments, the thickness of the coating layer is from 1 to 30 μm.

The thickness of the film layer may be from 10 to 60 μm. In some embodiments, the coat weight of the adhesive layer is from 5 to 50 g/m$^2$. In some embodiments, the flammability rating of the flame retardant label satisfies VTM-0. In some embodiments, the bottom surface is the surface facing an object to be labeled and the top surface is the surface on the opposite side of the bottom surface.

In some embodiments, the flame retardant label further comprises a liner layer that contacts the bottom surface of the adhesive layer. In these embodiment, the coat weight of the liner layer is from 50 to 150 g/m$^2$. The liner layer of these embodiments may comprise an embossed plastic paper. The liner layer of these embodiments comprise glassine coated with a liner polymer. The coat weight of the liner polymer may be from 5 to 50 g/m$^2$.

In some embodiments, the coating layer comprises a polyester in an amount ranging from 25 wt. % to 40 wt. %; the first base polymer has a hydroxyl value greater than 100 mgKOH/g; the second base polymer has a hydroxyl value less than 80 mgKOH/g and an acid value less than 35 mgKOH/g; the second base polymer has a glass transition temperature ranging from −40° C. to 0° C.; and the flammability rating of the flame retardant label satisfies VTM-0. In some embodiments, the thickness of the coating layer is 5 to 15 μm, the thickness of the film layer is 20 to 30 μm, and the coat weight of the adhesive layer is 15 to 25 g/m$^2$. In some embodiments, the first crosslinker comprises isocyanate; the first flame retardant agent comprises an organic phosphinate; the second flame retardant agent comprises an organic phosphinate; the tackifier comprises a terpene or a rosin; and the second crosslinker comprises isocyanate or epoxy. In some embodiments, the first crosslinker comprises isocyanate; the first flame retardant agent comprises an organic phosphinate; the second flame retardant agent comprises an organic phosphinate; the tackifier comprises a terpene or a rosin; the second crosslinker comprises isocyanate or epoxy; and the flammability rating of the flame retardant label satisfies VTM-0.

In some embodiments, the flame retardant label is affixed to a battery surface or a battery wrapping.

The invention also provides a method of labeling a battery comprising the steps of (i) providing a flame retardant label, comprising a coating layer, comprising a first base polymer, an isocyanate crosslinker, and a first flame retardant agent; a film layer; and an adhesive layer, comprising a second base polymer, a second flame retardant agent, a tackifier, and a second crosslinker; and (ii) affixing the flame retardant label to a battery surface or a battery wrapping.

BRIEF DESCRIPTION OF THE DRAWINGS

Embodiments are described in detail below with reference to the appended drawings, wherein like numerals designate similar parts.

DETAILED DESCRIPTION

Introduction

Figure 1:
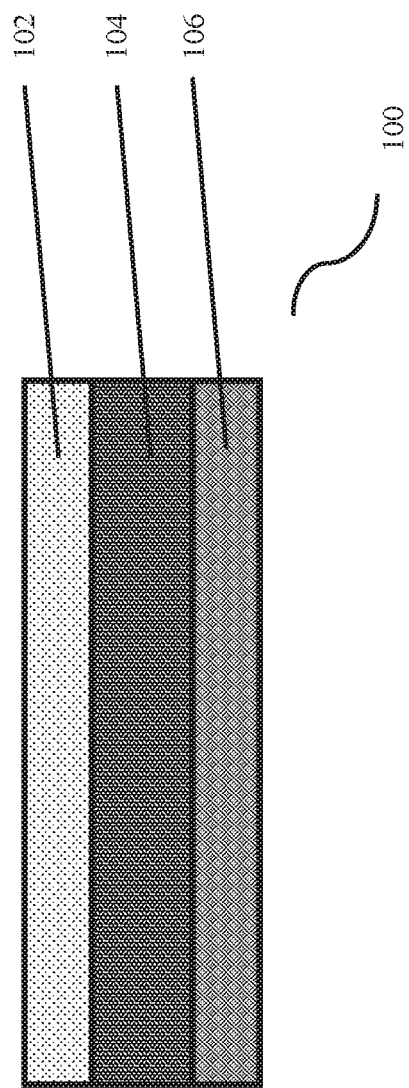
FIG. 1 illustrates a cross section of a flame retardant label having a coating layer, a film layer, and an adhesive layer in accordance with an embodiment.

As discussed above, labels for electrical equipment, e.g., a battery, must be flame retardant for protection against fire hazard. However, the addition of a flame retardant to labels may compromise other properties of the label, such as adhesion, converting, and reposition performance. For example, the addition of flame retardants to an adhesive layer may decrease the shear strength of the label, which may cause the label to become brittle. Also, the addition of flame retardants to an adhesive layer may detrimentally affect the label's adhesion and tack strength. In addition, adequate air egress is desirable to prevent the formation and trapping of air bubbles beneath the label. It has been discovered that the addition of flame retardants to conventional labels (to improve flame retardant performance) undesirably reduces the ease of air egress during application. In particular, it has now been discovered that the addition of flame retardant agents has a negative effect on the ease of adhesive flow. Thus, conventional means of producing flame retardant labels typically result in labels with both inadequate adhesion as well as inadequate air egress.

The inventors have discovered a unique combination of layers, each of which having a particular composition, that provides for a flame retardant label that demonstrates a synergistic combination of flame-retardant properties as well as good adhesion, repositioning, and/or converting performance, along with improved air egress properties. The flame retardant label comprises at least three layers: a coating layer, a film layer, and an adhesive layer. In some embodiments, the coating layer comprises a first base polymer, a first crosslinker, and a first flame retardant agent. In some embodiments, the adhesive layer comprises a second base polymer, a second flame retardant agent, a tackifier, and a second crosslinker. Optionally, the label further comprises a printable layer and/or a liner layer.

It has now been discovered that, to minimize the negative effect of the presence of flame retardant on the bonding properties of the adhesive layer, in some cases, an epoxy resin may be employed as a component of the adhesive layer, e.g., as a crosslinker. The combination of the epoxy resin and the second flame retardant (in lesser amounts) surprisingly improves both tack strength and flame-retardant properties. Conventionally, the flame retardant properties and adhesion properties have been found to be at odds with one another—an improvement in flame retardancy resulted in a decrease in adhesion properties, and vice versa. In some embodiments, (specific) crosslinkers are used to increase cohesiveness of the label. The combination of these crosslinkers, the epoxy resin, and the second flame retardant (in lesser amounts) unexpectedly provides for additional improvements in flame retardancy and label performance. Further, the inventors of the application have also discovered that the use of specific concentration ranges for the components provide for a desirable combination of performance characteristics.

It has also been discovered that the formation and trapping of air bubbles between the label and a labeled substrate can be mitigated by including in the label air egress channels (and by employing the particular adhesive layer compositions with low flame retardant content). In particular, the flame retardant labels can be constructed to define channels, e.g., in the adhesive layer, that allow for efficient air egress. The channels create a path by which air caught between the label and a substrate can pass, thereby preventing the formation of bubbles as well as allowing for the efficient removal of bubbles. Beneficially, because the channels also contribute to the scattering of light passing the through the label, the use of the air egress channels, along with the specific layers, provides for a label that advantageously has desirable haze properties, e.g., a haze value ranging from 5 to 80. Importantly, the lesser amounts of flame retardant advantageously may affect (e.g., increase) the flowability of the layer, which in turn, unexpectedly improves air egress through air egress channels.

Structure

As noted above, the flame retardant label comprises three layers: a coating layer, a film layer, and an adhesive layer. In some embodiments, the layers of the adhesive label are arranged such that at least a portion of the film layer is in contact with the adhesive layer. In some embodiments, the layers of the adhesive label are arranged such that at least a portion of the film layer is in contact with the coating layer. In some cases, the layers of the flame retardant label are arranged such that at least a portion of the film layers is disposed between the coating layer and the adhesive layer. In some cases, the coating layer, the film layer, and the adhesive layer are coextensive.

In some cases, other layers may also be included, and the film layer may not necessarily be in direct contact with the other layers. That is to say, "disposed between" does not necessarily mean "in contact with." As used herein, the term "coextensive" refers to a relationship between two or more layers such that the surface areas of adjacent or parallel faces of the layers are aligned with one another with little or no overhang (of at least one of the areas or layers). In some cases the extents of the areas or faces are within 90% of one another. For example, two or more layers are coextensive if the surface areas of adjacent or parallel faces of the layers are within 90%, within 92%, within 94%, within 96%, or within 98% of one another. The term "coextensive" can also refer to a relationship between two or more layers such that the lengths of the layers are within 90% of one another. For example, two or more layers are coextensive if the lengths of the layers are within 90%, within 92%, within 94%, within 96%, or within 98% of one another. The term "coextensive" can also refer to a relationship between two or more layers such that the widths of the layers are within 90% of one another. For example, two or more layers are coextensive if the widths of the layers are within 90%, within 92%, within 94%, within 96%, or within 98% of one another.

In some embodiments, each of the topcoat layer, the film layer, the adhesive layer have opposing top and bottom surfaces, with the bottom surface being the surface that faces the substrate. From the perspective of looking downwardly toward a labeled electrical device, e.g., a battery, the film layer may be beneath the coating layer, e.g., the top surface of the film layer is in contact with the bottom surface of the coating layer, and above the adhesive layer, e.g., the bottom surface of the film layer is in contact with the top surface of the adhesive layer. Other layers may also be present between the coating layer and the adhesive layer. Without being bound by theory, it is believed that an improvement is seen when (at least a portion of) the coating layer is not in direct contact with (at least a portion of) the adhesive layer, e.g., the lack of contact between the coating layer and the adhesive layer and/or the contact of the adhesive layer with at least a portion of the film layer provides for a beneficial synergistic effect.

FIG. 1 shows a cross section of an embodiment of the flame retardant label 100. The flame retardant label 100 comprises a coating layer 102, a film layer 104, and an adhesive layer 106, wherein the film layer 104 is disposed between the coating layer 102 and the adhesive layer 106.

In some embodiments, one or more of the topcoat layer, the film layer, and/or the adhesive layer may define channels, e.g., irregularities or ridges in the top and/or bottom surface of the respective layer. In some cases, the adhesive layer alone includes channels. In particular, the bottom surface of the adhesive layer defines channels in the flame retardant label. The channels create a path by which air caught between the label and a substrate can pass, thereby preventing the formation of bubbles as well as allowing for the efficient removal of bubbles. Said another way, the channels act as a duct through which air trapped under the label during application may flow so as to be released.

The size of the channels may vary widely. In one embodiment, the channels have a width ranging from 80 to 200 µm, e.g., from 80 to 180 µm, from 80 to 175 µm, from 80 to 160 µm, from 80 to 150 µm, from 90 to 200 µm, from 90 to 180 µm, from 90 to 175 µm, from 90 to 160 m, from 90 to 150 µm, from 100 to 200 µm, from 100 to 180 µm, from 100 to 175 µm, from 100 to 160 µm, from 100 to 150 µm, from 110 to 200 µm, from 110 to 180 µm, from 110 to 175 µm, from 110 to 160 µm, or from 110 to 150 µm. In terms of lower limits, the channels may have a width greater than 80 µm, e.g., greater than 90 µm, greater than 100 µm, or greater than 110 µm. In terms of upper limits, the channels may have a width less than 200 µm, e.g., less than 180 µm, less than 175 µm, less than 160 µm, or less than 150 µm.

The average depth of the channels may vary widely, so long as the average depth is less than the thickness of the layer in which the channel is formed. The inventors have found that the selection of the depth of the channels has important effects on the flame retardant label, e.g., by affecting the scattering of light passing through the flame retardant label. In one embodiment, the channels have an average depth ranging from 1 to 25 µm, e.g., from 2 to 25 µm, from 3 to 25 µm, from 5 to 25 µm, from 8 to 25 µm, 1 to 22 µm, from 2 to 22 µm, from 3 to 22 µm, from 5 to 22 µm, from 8 to 22 µm, 1 to 20 µm, from 2 to 20 µm, from 3 to 20 µm, from 5 to 20 µm, from 8 to 20 µm, 1 to 18 µm, from 2 to 18 µm, from 3 to 18 µm, from 5 to 18 µm, from 8 to 18 µm, 1 to 15 µm, from 2 to 15 µm, from 3 to 15 µm, from 5 to 15 µm, or from 8 to 15 µm. In terms of lower limits, the channels may have an average depth greater than 1 µm, e.g., greater than 2 µm, greater than 3 µm, greater than 5 µm, or greater than 8 µm. In terms of upper limits, the channels may have an average depth less than 25 µm, e.g., less than 22 µm, less than 20 µm, less than 18 µm, or less than 15 µm.

The creation of the channels may vary widely. For example, it is possible to create channels in a given layer by using known machinery, e.g., die-cutter. However, the use of separate machinery to create channels in a given layer may create inefficiencies in the production of the flame retardant label. The inventors have found that, on the contrary, production efficiencies are created where channels are created in a given layer through application of another layer that comprises ridges. For example, in embodiments of the flame retardant label that comprise a liner layer, as described below, and that are configured such that the bottom surface of the adhesive layer contacts the top surface of the liner layer, channels in the bottom surface of the adhesive layer can be formed by creating ridges in the top surface of the liner layer. The ridges of the liner layer remain imprinted as channels in the bottom surface of the adhesive layer when the liner layer is removed during application. Alternatively, the channels may be created by applying the layer to the ridges of the liner layer, e.g., without imprinting.

Figure 2:
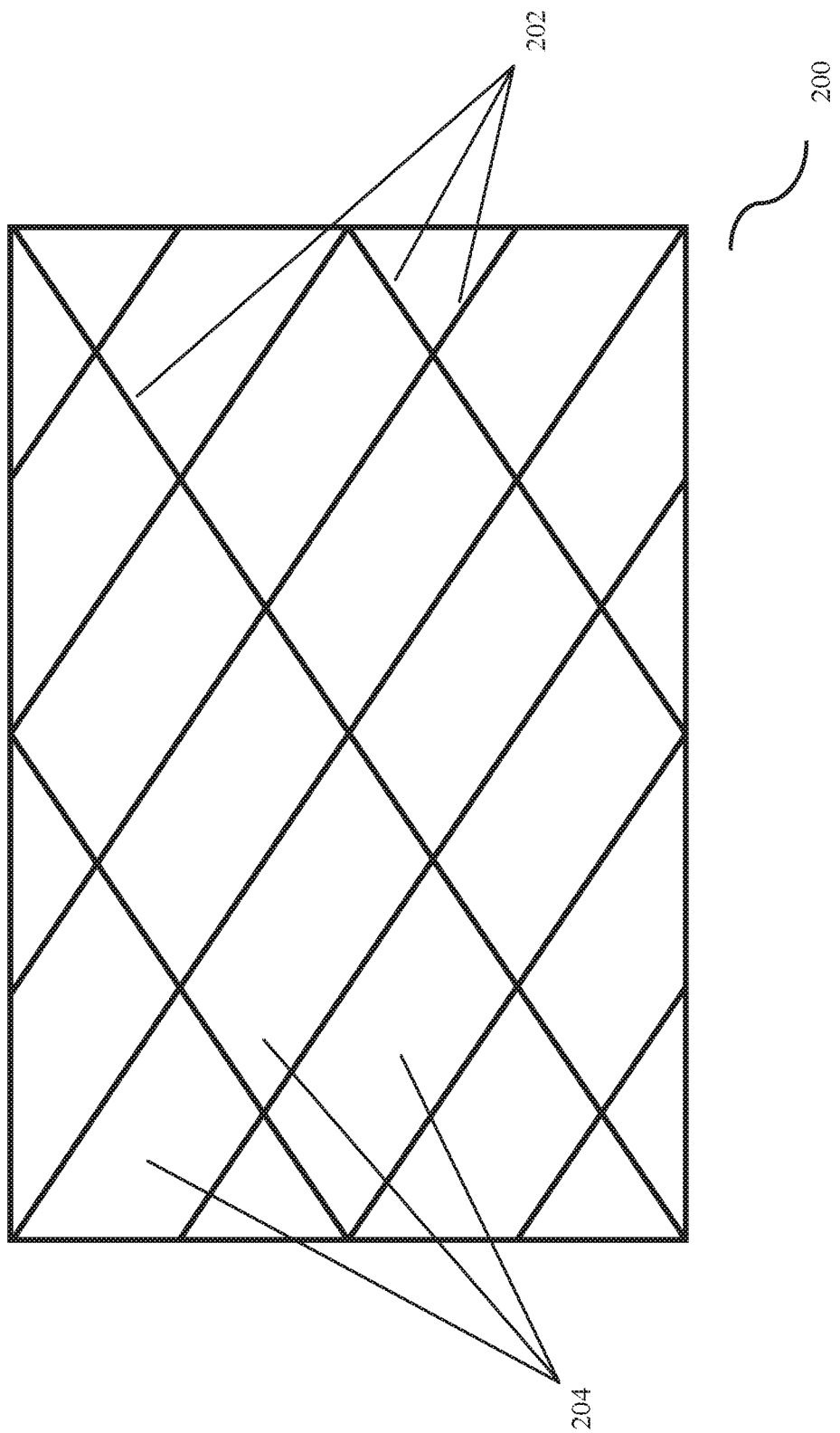
FIG. 2 illustrates a face-on view of the top surface of a liner layer having ridges.

The planar design or layout of the ridges of the liner layer may vary widely. In some embodiments, the planar design or layout of the ridges may be as randomized lines, curves, or shapes. In other embodiments, the planar design or layout of the ridges may be as regular shapes, e.g., squares, rectangles, rhombuses, triangles, or circles. In some cases, the planar layout of the ridges may be as lines and/or curves that are substantially parallel. In some cases, the planar layout of the ridges may be as lines and/or curves that intersect at substantially regular angles. In one case, shown in FIG. 2, the planar layout 200 of the ridges 202 is as an array of tessellating rhombuses 204.

Coating Layer

The flame retardant label comprises a coating layer. In some embodiments, the coating layer is disposed above the film layer. Said another way, in some embodiments, a bottom surface of the coating layer is in contact with (at least a portion of) a top surface of the film layer.

In one embodiment, the coating layer of the flame retardant label comprises a first base polymer. The coating layer may further comprise a first crosslinker and a first flame retardant agent.

The composition of first base polymer may vary widely, and any suitable polymer may be used, provided the characteristics described herein are satisfied. In some embodiments, the first base polymer comprises a polyester. In some embodiments, the first base polymer of the coating layer may be a polyester polyol, e.g., a hydroxylated polyester polyol. In some cases, the first base polymer may be an acrylic modified saturated polyester polyol resin or a polyacrylate polyol.

Examples of suitable commercially available polyester polyols that may be used as the first base polymer include Uralac® SC953, Uralac® SN862, Uralac® SY942, Uralac® SY941, Uralac® SY944 by DSM, Hypomer PE-8043 by ELEMENTIS. Desmophen® 1300PR, Desmophen® 1400PR, Desmophen® PL302, Desmophen® 817, Desmophen® RD181, Desmophen® 650, Desmophen® 651, Desmophen® 670, Desmophen® 800, Desmophen® 850, Desmophen® 1100, Desmophen® 1145, Desmophen® 1150, Desmophen® 1155, Desmophen® 1200, Desmophen® 1300 by COVESTRO. Capa® 2043, Capa® 2054, Capa® 2085, Capa® 3050, Capa® 3091, Capa® 4101 by PERSTORP. Synolac 680X60 by ARKEMA.

Examples of suitable commercially available polyacrylate polyols that may be used as the first base polymer include Hypomer FS-2970, Hypomer FS-3060, Hypomer FS-3270, Hypomer FS-4365A, Hypomer FS-4470, Hypomer FS-4660P by ELEMENTIS. Uralac® CY250, Uralac® CY240, HY Hybrane™ CY245, Hybrane™ CY235 by DSM. Desmophen® A665, Desmophen® A870 from COVESTRO. Synocure 865 EEP 70, Synocure 9237, Synocure 866, Synocure 9201, Synocure 570 X65, and Synocure 9279 S70 by ARKEMA.

In some embodiments, the first base polymer comprises hydroxyl functional groups. The inventors have surprisingly found that hydroxyl functional groups can beneficially interact, e.g., form a complex, with the first flame retardant agent, thereby improving the flame retardant capabilities of the label.

The presence of hydroxyl functional groups in a polymer can be quantified by the polymer's hydroxyl value, which is the amount of potassium hydroxide required to neutralize the acetic acid taken up on acetylation of one gram of a polymer that contains free hydroxyl groups. In one embodiment, the first base polymer of the coating layer has a hydroxyl value greater than 100 mgKOH/g, e.g., greater than 105 mgKOH/g, greater than 108 mgKOH/g, greater than 110 mgKOH/g, or greater than 112 mgKOH/g. In terms of upper limits, the first base polymer may have a hydroxyl value less than 350 mgKOH/g, e.g., less than 330 mgKOH/g, less than 325 mgKOH/g, less than 320 mgKOH/g, or less than 300 mgKOH/g. In terms of ranges, the first base polymer have a hydroxyl value from 100 to 300 mgKOH/g, e.g., from 105 to 300 mgKOH/g, from 108 to 300 mg KOH/g, from 110 to 300 mgKOH/g, from 112 to 300 mgKOH/g, from 100 to 330 mgKOH/g, from 105 to 330 mgKOH/g, from 108 to 330 mg KOH/g, from 110 to 330 mgKOH/g, from 112 to 330 mgKOH/g, from 100 to 325 mgKOH/g, from 105 to 325 mgKOH/g, from 108 to 325 mg KOH/g, from 110 to 325 mgKOH/g, from 112 to 325 mgKOH/g, from 100 to 320 mgKOH/g, from 105 to 320 mgKOH/g, from 108 to 320 mg KOH/g, from 110 to 320 mgKOH/g, from 112 to 320 mgKOH/g, from 100 to 300 mgKOH/g, from 105 to 300 mgKOH/g, from 108 to 300 mg KOH/g, from 110 to 300 mgKOH/g, or from 112 to 300 mgKOH/g. Without being bound by theory, it is believed that the hydroxyl groups may help prevent the combustion reaction and eliminate or reduce further burning.

In one embodiment, the coating layer contains from 20 to 60 wt. % of the first base polymer, based on the total weight of the coating layer, e.g., from 25 to 60 wt. %, from 30 to 60 wt. %, from 35 to 60 wt. %, from 20 to 55 wt. %, from 25 to 55 wt. %, from 30 to 55 wt. %, from 35 to 55 wt. %, from 20 to 50 wt. %, from 25 to 50 wt. %, from 30 to 50 wt. %, from 35 to 50 wt. %, from 20 to 45 wt. %, from 25 to 45 wt. %, from 30 to 45 wt. %, or from 35 to 45 wt. %. In terms of lower limits, in some embodiments of the flame retardant label, the coating layer may comprise greater than 20 wt. % of the first base polymer, e.g., greater than 25 wt. %, greater than 30 wt. %, or greater than 35 wt. %, based on the total weight of the coating layer. In terms of upper limits, in some embodiments of the flame retardant label, the coating layer may comprise less than 60 wt. %. of the first base polymer, e.g., less than 55 wt. %., less than 50 wt. %, or less than 45 wt. %. The amount of the first base polymer may be chosen based on the desired stiffness of the coating layer, the amount of flame retardant agent present in the coating layer, and/or the ability to provide sufficient anchorage of the coating layer on the film layer. In general, a lower weight percentage of the first base polymer and/or a higher weight percentage amount of flame retardant is correlated with a more stiff flame retardant label. The stiffness of the label may affect the performance characteristics or usability of the label, i.e., the capability of being slit into small labels of suitable shapes and sizes.

The coating layer may also comprise a first crosslinker. In general, a crosslinker is a substance that forms a cross-link between polymer chains, e.g., by bonding to each polymer chain. Typically, the addition of a crosslinker increases stiffness or rigidity. The composition of the first crosslinker may vary widely. In some embodiments, the coating layer comprises an isocyanate crosslinker. For example, in some embodiments, the first crosslinker comprises aromatic isocyanates, aliphatic isocyanates, aromatic di-isocyanates, aliphatic di-isocyanates, aromatic polyisocyanates, or aliphatic polyisocyanates, or combinations thereof.

Examples of suitable commercially available products that may be used as the first crosslinker include Desmodur N 75A BA, Desmodur N 75A BA/X, Desmodur N 100A, Desmodur N 3200, Desmodur N 3300A, Desmodur N 3390A BA/SN, Desmodur N 3600, Desmodur N 3580, Desmodur N 3790 BA, Desmodur PL 3800, Desmodur N 3900, Desmodur PL 340 BA/SN, Desmodur NZ1, Desmodur E3265, Desmodur E3370, Desmodur PL 350 MPA/SN, Desmodur TS 35, Desmodur TS 50, Desmodur VL, Desmodur VP LS 2078/2, Desmodur VP LS 2371, Desmodur VP LS 2397, Desmodur VP. PU ME 28TF04, Desmodur VP. PU MS 30TF01, Desmodur W, Desmodur XP 2410, Desmodur XP 2500, Desmodur XP 2580, Desmodur XP 2565, Desmodur XP 2489, Desmodur XP 2565, Desmodur XP 2599, Desmodur XP 2617, Desmodur XP 2675, Desmodur XP 2763, Desmodur XP 2795, Desmodur XP 2838, Desmodur XP 2840, Desmodur Z 4470 BA, Desmodur Z 4470 MPA/X, Desmodur Z 4470 SN, Desmodur Z 4470 SN/BA, Desmodur IL 1351, Desmodur LD, Desmodur LP BUEJ 471, Mondur 445, Mondur 448 by COVESTRO (formerly Bayer Material Sciences). Basonat HA 100, Basonat HA 200, Basonat HA 300, Lupranat M10R, Lupranat M20FB, Lupranat M20S, Lupranat M50, Lupranat M70R, Lupranat ME, Lupranat MI, Lupranat MM103, Lupranat MP102; Lupranat MP105, Lupranat MR, Lupranat T80A by BASF, Isonate 50 O, Isonate 125 M, Isonate 143 L, Isonate 181, Isonate 240, PAPI 20, PAPI 27, PAPI 94, PAPI 95, PAPI 580N, and PAPI 901 by DOW CHEMICAL. Takenate 500, Takenate 600, Takenate 700, Takenate D110N, Takenate D120N, Takenate D131N, Takenate D140N, Takenate D160N, Takenate D165N, Takenate D170N, Takenate D178N, Stabio D3725N by MITSUI CHEMICALS.

In one embodiment, the coating layer contains from 10 to 30 wt. % of the first crosslinker, based on the total weight of the coating layer, e.g., from 10 to 28 wt. %, from 10 to 25 wt. %, from 10 to 22 wt. %, from 12 to 30 wt. %., from 12 to 28 wt. %, from 12 to 25 wt. %, from 12 to 22 wt. %, from 15 to 30 wt. %., from 15 to 28 wt. %, from 15 to 25 wt. %, from 15 to 22 wt. %, from 18 to 30 wt. %., from 18 to 28 wt. %, from 18 to 25 wt. %, from 18 to 22 wt. %, from 20 to 30 wt. %., from 20 to 28 wt. %, from 20 to 25 wt. %, or from 20 to 22 wt. %. In terms of lower limits, the coating layer may contain greater than 10 wt. %. of the first crosslinker, based on the total weight of the coating layer, e.g., greater than 12 wt. %., greater than 15 wt. %, greater than 18 wt. %., or greater than 20 wt. %. In terms of upper limits, the coating layer may contain less than 30 wt. %. of the first crosslinker, based on the total weight of the coating layer, e.g., less than 28 wt. %., less than 25 wt. %, or less than 22 wt. %.

As noted above, the coating layer may comprise a first flame retardant agent. The composition of the first flame retardant agent may vary widely, and any conventional flame retardant may be used, provided the characteristics described herein are satisfied. In some embodiments, the first flame retardant agent comprises one or more organic phosphinates. For example, the first flame retardant agent may comprise metallic salts of organic phosphinates, e.g., salts of organic phosphinates comprising magnesium, calcium, aluminum, antimony, tin, titanium, zinc, or iron. In some embodiments, the first flame retardant agent may comprise organic diphosphinates. In some cases, the first flame retardant agent is an aluminum salt of an organic disphosphinate.

Examples of suitable commercially available products that may be used as the first flame retardant agent include the Exolit® OP series by Clariant.

In one embodiment, the coating layer contains from 20 to 60 wt. % of the first flame retardant agent, based on the total weight of the coating layer, e.g., from 25 to 60 wt. %, from 30 to 60 wt. %, from 35 to 60 wt. %, from 20 to 55 wt. %, from 25 to 55 wt. %, from 30 to 55 wt. %, from 35 to 55 wt. %, from 20 to 50 wt. %, from 25 to 50 wt. %, from 30 to 50 wt. %, from 35 to 50 wt. %, from 20 to 45 wt. %, from 25 to 45 wt. %, from 30 to 45 wt. %, or from 35 to 45 wt. %. In terms of lower limits, in some embodiments of the flame retardant label, the coating layer may comprise greater than 20 wt. % of the first flame retardant agent, e.g., greater than 25 wt. %, greater than 30 wt. %, or greater than 35 wt. %, based on the total weight of the coating layer. In terms of upper limits, in some embodiments of the flame retardant label, the coating layer may comprise less than 60 wt. %. of the first flame retardant agent, e.g., less than 55 wt. %., less than 50 wt. %, or less than 45 wt. %.

In one embodiment, the coating layer has a thickness ranging from 1 to 30 µm, e.g., from 1 to 25 µm, from 1 to 20 µm, from 1 to 15 µm, from 1 to 12 µm, from 2 to 30 µm, from 2 to 25 µm, from 2 to 20 µm, from 2 to 15 µm, from 2 to 12 µm, from 5 to 30 µm, from 5 to 25 µm, from 5 to 20 µm, from 5 to 15 µm, from 5 to 12 µm, from 8 to 30 µm, from 8 to 25 µm, from 8 to 20 µm, from 8 to 15 µm, or from 8 to 12 µm. In terms of lower limits, the film layer may have a thickness of at least 1 µm, e.g., at least 2 µm, at least 5 µm, or at least 8 µm. In terms of upper limits, the film layer may have a thickness less than 30 µm, e.g., less than 25 µm, less than 20 µm, less than 15 µm, or less than 12 µm.

Film Layer

As noted above, the flame retardant label comprises at least one film layer. In some embodiments, the film layer is disposed between the coating layer and the adhesive layer. In some embodiments, at least a portion of the film layer is in contact with the coating layer. The film layer can be a polymeric film or a metal foil. Materials for the film layer may be resins selected from polyester, ABS, polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PEI), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, DIALAMY, (polymer alloys), polyethylene naphthalate (PEN), ethylene/tetrafluoroethylene, (E/TFE), polyphenyl sulfone (PPSU) and polymers or polymer alloys containing one or more of these materials. In some embodiments, the flame retardancy of the film layer meets the VTM-2, VTM-2, or VTM-0 standard. In some cases, the film is a polyethylene terephthalate (PET) film. In some embodiments, the film meets the requirement of VTM-0, VTM-1, or VTM-2. In some embodiments, the film layer also contains a flame retardant. Any of the flame retardants, e.g., those suitable for use in the coating layer or the adhesive layer as described herein, can be used in the film layer. The flame retardant used in the film layer may or may not be the same as the flame retardant used in the other layers of the flame retardant label. In some embodiments, the film is a PET film. In some embodiments, the film is a VTM-0 PET film or a VTM-2 PET film. Various PET films are commercially available, for example, from Dupont Teijin Films' MELINEX® series, Mitsubishi's HOSTAPHAN® series, etc.

From the perspective of looking downwardly toward the substrate, the film layer may be configured beneath the coating layer, e.g., the top surface of the film layer is in contact with the bottom surface of the coating layer, and above the adhesive layer, e.g., the bottom surface of the film layer is in contact with the top surface of the adhesive layer. As noted above, the configuration of the film layer between the coating layer and the adhesive layer (optionally along with the specific compositions of the various layers) has been found to unexpectedly provide for improved flame retardant properties and an additional combination of performance characteristics.

In one embodiment, the film layer has a thickness ranging from 10 to 60 µm, e.g., from 10 to 58 µm, from 10 to 55 µm, from 10 to 52 µm, from 10 to 50 µm, from 12 to 60 µm, from 12 to 58 µm, from 12 to 55 µm, from 12 to 52 µm, from 12 to 50 µm, from 15 to 60 µm, from 15 to 58 µm, from 15 to 55 µm, from 15 to 52 µm, from 15 to 50 µm, from 20 to 60 µm, from 20 to 58 µm, from 20 to 55 µm, from 20 to 52 µm, or from 20 to 50 µm. In terms of lower limits, the film layer may have a thickness of at least 10 µm, e.g., at least 12 µm, at least 15 µm, or at least 20 µm. In terms of upper limits, the film layer may have a thickness less than 60 µm, e.g., less than 58 µm, less than 55 µm, less than 52 µm, or less than 50 µm.

Adhesive Layer

The flame retardant label comprises an adhesive layer. In some embodiments, the adhesive layer is disposed below the film layer. Said another way, in some embodiments, a top surface of the adhesive layer is in contact with (at least a portion of) a bottom surface of the film layer.

In one embodiment, the adhesive layer of the flame retardant label comprises a second base polymer. The adhesive layer may further comprise a second flame retardant agent, a tackifier, and a second crosslinker. The composition of the second base polymer may vary widely, and any polymer may be used, provided the characteristics described herein are satisfied. In some embodiments, the second base polymer comprises a polyester or a polyacrylate, or combinations thereof. In some cases, the second base polymer comprises an acrylic resin. In some embodiments, the second base polymer may comprise a pressure sensitive adhesive, e.g., a hydroxyl group substituted acrylic polymer. Suitable pressure sensitive adhesives may include, for example, copolymers of alkyl acrylates that have a straight chain of from 4 to 12 carbon atoms and a minor proportion of a highly polar copolymerizable monomer such as acrylic acid. In some cases, the second base polymer may be an ultraviolet-curable pressure sensitive adhesive.

Examples of suitable commercially available products that may be used as the second base polymer include Duro-Tak® 80-115 A or Duro-Tak 4000 by National Starch, Chemical Co. or Aroset™ 1860-Z-45 by Ashland Specialty Chemical Company.

In some embodiments, the second base polymer comprises hydroxyl functional groups. As noted above, the presence of hydroxyl functional groups can be quantified by the polymer's hydroxyl value. In one embodiment, the second base polymer of the adhesive layer has a hydroxyl value less than 100 mgKOH/g, e.g., less than 95 mgKOH/g, less than 90 mgKOH/g, less than 85 mgKOH/g, or less than 80 mgKOH/g. In terms of lower limits, the second base polymer may have a hydroxyl value greater than 0 mgKOH/g, e.g., greater than 2 mgKOH/g, greater than 5 mgKOH/g, or greater than 10 mgKOH/g. In terms of ranges, the second base polymer may have a hydroxyl value from 0 to 100 mgKOH/g, e.g., from 0 to 95 mgKOH/g, from 0 to 90 mgKOH/g, from 0 to 85 mgKOH/g, from 0 to 80 mgKOH/g, from 2 to 100 mgKOH/g, from 2 to 95 mgKOH/g, from 2 to 90 mgKOH/g, from 2 to 85 mgKOH/g, from 2 to 80 mgKOH/g, from 5 to 100 mgKOH/g, from 5 to 95 mgKOH/g, from 5 to 90 mgKOH/g, from 5 to 85 mgKOH/g, from 5 to 80 mgKOH/g, from 10 to 100 mgKOH/g, from 10 to 95 mgKOH/g, from 10 to 90 mgKOH/g, from 10 to 85 mgKOH/g, or from 10 to 80 mgKOH/g.

In some embodiments, the second base polymer comprises acid functional groups, e.g., carboxylic acid functional groups. The presence of acid functional groups in a polymer can be quantified by the polymer's acid value, which is the amount of potassium hydroxide required to neutralize one gram of a polymer that contains acid groups. In some embodiments, the second base polymer of the adhesive layer has an acid value less than 100 mgKOH/g, e.g., less than 95 mgKOH/g, less than 90 mgKOH/g, less than 85 mgKOH/g, or less than 80 mgKOH/g. In terms of lower limits, the second base polymer may have an acid value greater than 0 mgKOH/g, e.g., greater than 2 mgKOH/g, greater than 5 mgKOH/g, or greater than 10 mgKOH/g. In terms of ranges, the second base polymer may have an acid value from 0 to 100 mgKOH/g, e.g., from 0 to 95 mgKOH/g, from 0 to 90 mgKOH/g, from 0 to 85 mgKOH/g, from 0 to 80 mgKOH/g, from 2 to 100 mgKOH/g, from 2 to 95 mgKOH/g, from 2 to 90 mgKOH/g, from 2 to 85 mgKOH/g, from 2 to 80 mgKOH/g, from 5 to 100 mgKOH/g, from 5 to 95 mgKOH/g, from 5 to 90 mgKOH/g, from 5 to 85 mgKOH/g, from 5 to 80 mgKOH/g, from 10 to 100 mgKOH/g, from 10 to 95 mgKOH/g, from 10 to 90 mgKOH/g, from 10 to 85 mgKOH/g, or from 10 to 80 mgKOH/g.

In some embodiments, the second base polymer has a glass transition temperature from −50 to 10° C., e.g., from −50 to 8° C., from −50 to 5° C., from −50 to 2° C., from −50 to 0° C., from −48 to 10° C., from −48 to 8° C., from −48 to 5° C., from −48 to 2° C., from −48 to 0° C., from −45 to 10° C., from −45 to 8° C., from −45 to 5° C., from −45 to 2° C., from −45 to 0° C., from −42 to 10° C., from −42 to 8° C., from −42 to 5° C., from −42 to 2° C., from −42 to 0° C., from −40 to 10° C., from −40 to 8° C., from −40 to 5° C., from −40 to 2° C., or from −40 to 0° C. In terms of lower limits, the second base polymer may have glass transition temperature greater than −50° C., e.g., greater than −48° C., greater than −45° C., greater than −42° C., or greater than −40° C. In terms of upper limits, the second base polymer may have a glass transition temperature less than 10° C., e.g., less than 8° C., less than 5° C., less than 2° C., or less than 0° C.

In one embodiment, the adhesive layer contains from 50 to 100 wt. % of the second base polymer, based on the total weight of the adhesive layer, e.g., from 55 to 100 wt. %, from 60 to 100 wt. %, from 65 to 100 wt. %, from 50 to 95 wt. %, from 55 to 95 wt. %, from 60 to 95 wt. %, from 65 to 95 wt. %, from 50 to 90 wt. %, from 55 to 90 wt. %, from 60 to 90 wt. %, from 65 to 90 wt. %, from 50 to 85 wt. %, from 55 to 85 wt. %, from 60 to 85 wt. %, or from 65 to 85 wt. %. In terms of lower limits, in some embodiments of the flame retardant label, the adhesive layer may comprise greater than 50 wt. % of the second base polymer, e.g., greater than 55 wt. %, greater than 60 wt. %, or greater than 65 wt. %, based on the total weight of the adhesive layer. In terms of upper limits, in some embodiments of the flame retardant label, the adhesive layer may comprise less than 100 wt. %. of the second base polymer, e.g., less than 95 wt. %., less than 90 wt. %, or less than 85 wt. %, based on the total weight of the adhesive layer.

As noted above, the adhesive layer may further comprise a tackifier. Generally, a tackifier is a chemical compound used to increase the tack, e.g., the stickiness, of the surface of an adhesives. The composition of the tackifier of the adhesive layer may vary widely, provided the characteristics disclosed herein are satisfied. In some embodiments, the tackifier may comprise a rosin, a rosin derivative, a terpene, a modified terpene, an aliphatic, cycloaliphatic, or aromatic resin, a hydrogenated hydrocarbon resin, a terpene-phenol resin, or derivatives thereof, or combinations thereof. In some cases, the tackifier is a rosin resin, an AMS resin, or a coumarone resin. In other cases, the tackifier is a combination of a rosin resin and a terpene resin.

In one embodiment, the tackifier of the adhesive layer has an average softening point that is less than 125° C., e.g., less than 120° C., less than 115° C., or less than 110° C. In terms up lower limits, the tackifier may have an average softening point that is greater than 50° C., e.g., greater than 55° C., greater than 60° C., greater than 65° C., or greater than 75° C. In terms of ranges, the tackifier may have an average softening point that is from 50 to 125° C., e.g., from 50 to 120° C., from 50 to 115° C., from 50 to 110° C., from 55 to 125° C., from 55 to 120° C., from 55 to 115° C., from 55 to 110° C., from 60 to 125° C., from 60 to 120° C., from 60 to 115° C., from 60 to 110° C., from 65 to 125° C., from 65 to 120° C., from 65 to 115° C., from 65 to 110° C., from 75 to 125° C., from 75 to 120° C., from 75 to 115° C., or from 75 to 110° C.

In one embodiment, the adhesive layer comprises from 5 to 60 wt. % of the tackifier, based on the total weight of the adhesive layer, e.g., from 5 to 55 wt. %, from 5 to 50 wt. %, from 5 to 40 wt. %, from 8 to 60 wt. %., from 8 to 55 wt. %, from 8 to 50 wt. %, from 8 to 40 wt. %, from 10 to 60 wt. %, from 10 to 55 wt. %, from 10 to 50 wt. %, from 10 to 40 wt. %, from 12 to 60 wt. %, from 12 to 55 wt. %, from 12 to 50 wt. %, from 12 to 40 wt. %, from 15 to 60 wt. %, from 15 to 55 wt. %, from 15 to 50 wt. %, or from 15 to 40 wt. %. In terms of lower limits, the adhesive layer may comprise greater than 5 wt. %. of the tackifier, e.g., greater than 8 wt. %, greater than 10 wt. %, greater than 12 wt. %, or greater than 15 wt. %, based on the total weight of the adhesive layer. In terms of upper limits, the adhesive layer may comprises less than 60 wt. %. of the tackifier, e.g., less than 60 wt. %, less than 55 wt. %, less than 50 wt. %, or less than 40 wt. %, based on the total weight of the adhesive layer.

The inventors have surprisingly and unexpectedly found that the relative content of the tackifier to the second base polymer affects the adhesion activity of the flame retardant label. In particular, maintaining a specific weight ratio of the tackifier to the second base polymer can ensure that the adhesion performance of the flame retardant label remains satisfactory despite the addition of a flame retardant agent. In one embodiment, the weight ratio of the tackifier in the adhesive layer to the second base polymer is from 1:10 to 1.5:1, e.g., from 1:5 to 1.5:1, from 3:10 to 1.5:1, from 2:5 to 1.5:1, from 1:2 to 1.5:1, from 1:10 to 1.4:1, from 1:5 to 1.4:1, from 3:10 to 1.4:1, from 2:5 to 1.4:1, from 1:2 to 1.4:1, from 1:10 to 1.3:1, from 1:5 to 1.3:1, from 3:10 to 1.3:1, from 2:5 to 1.3:1, from 1:2 to 1.3:1, from 1:10 to 1.2:1, from 1:5 to 1.2:1, from 3:10 to 1.2:1, from 2:5 to 1.2:1, from 1:2 to 1.2:1, from 1:10 to 1:1, from 1:5 to 1:1, from 3:10 to 1:1, from 2:5 to 1:1, or from 1:2 to 1:1. In terms of lower limits, the weight ratio of the tackifier to the second base polymer may be greater than 1:10, e.g., greater than 1:5, greater than 3:10, greater than 2:5, or greater than 1:2. In terms of upper limits, the weight ratio of the tackifier to the second base polymer may be less than 1.5:1, e.g. less than 1.4:1, less than 1.3:1, less than 1.2:1, or less than 1:1.

As noted above, the adhesive layer may also comprise a second crosslinker. Generally, crosslinkers differ in regard to crosslinker density and reaction rate. The inventors have surprisingly found that the selection of a second crosslinker, based on these parameters, beneficially affects the formation of channels in the adhesive layer, as discussed below. The composition of the second crosslinker may vary widely. For example, the second crosslinker may comprise an isocyanate compound, a dialdehyde, a metal chelate compound, a metal alkoxide, a metal salt, and mixtures thereof. In some cases, adhesive layer comprises an epoxy crosslinker.

In one embodiment, the adhesive layer contains from 0.1 to 5 wt. % of the second crosslinker, based on the total weight of the coating layer, e.g., from 0.1 to 4 wt. %, from 0.1 to 3 wt. %, from 0.1 to 2 wt. %, from 0.5 to 5 wt. %., from 0.5 to 4 wt. %, from 0.5 to 3 wt. %, from 0.5 to 2 wt. %, from 1 to 5 wt. %., from 1 to 4 wt. %, from 1 to 3 wt. %, from 1 to 2 wt. %, from 1.2 to 5 wt. %., from 1.2 to 4 wt. %. from 1.2 to 3 wt. %. from 1.2 to 2 wt. %. from 1.5 to 5 wt. %., from 1.5 to 4 wt. %, from 1.5 to 3 wt. %, or from 1.5 to 2 wt. %. In terms of lower limits, the adhesive layer may contain greater than 0.1 wt. %. of the second crosslinker, based on the total weight of the coating layer, e.g., greater than 0.5 wt. %., greater than 1 wt. %, greater than 1.2 wt. %., or greater than 1.5 wt. %. In terms of upper limits, the adhesive layer may contain less than 5 wt. %. of the second crosslinker, based on the total weight of the coating layer, e.g., less than 4 wt. %., less than 3 wt. %, or less than 2 wt. %.

The inventors have surprisingly and unexpectedly found that the relative content of the second crosslinker to the second base polymer affects the adhesion activity of the flame retardant label. In particular, maintaining a specific weight ratio of the second crosslinker to the second base polymer can ensure that the adhesion performance of the flame retardant label remains satisfactory despite the addition of a flame retardant agent. In one embodiment, the weight ratio of the second crosslinker in the adhesive layer to the second base polymer is from 1:100 to 15:100, e.g., from 1.5:100 to 15:100, from 2:100 to 15:100, from 2.5:100 to 15:100, from 3:100 to 15:100, from 1:100 to 12:100, from 1.5:100 to 12:100, from 2:100 to 12:100, from 2.5:100 to 12:100, from 3:100 to 12:100, from 1:100 to 10:100, from 1.5:100 to 10:100, from 2:100 to 10:100, from 2.5:100 to 10:100, from 3:100 to 10:100, from 1:100 to 8:100, from 1.5:100 to 8:100, from 2:100 to 8:100, from 2.5:100 to 8:100, from 3:100 to 8:100, from 1:100 to 5:100, from 1.5:100 to 5:100, from 2:100 to 5:100, from 2.5:100 to 5:100, or from 3:100 to 5:100. In terms of lower limits, the weight ratio of the second crosslinker to the second base polymer may be greater than 1:100, e.g., greater than 1.5:100, greater than 2:100, greater than 2.5:100, or greater than 3:100. In terms of upper limits, the weight ratio of the second crosslinker to the second base polymer may be less than 15:100, e.g. less than 12:100, less than 10:100, less than 8:100, or less than 5:100.

The adhesive layer may also comprise a second flame retardant agent. The composition of the second flame retardant agent may vary widely. In particular, any of the flame retardant agents suitable for use as the first flame retardant agent, described above, may be used as the second flame retardant agent, provided that other features of the flame retardant label discussed herein are met. The first flame retardant agent of the coating layer may or may not be the same as the second flame retardant agent used in the adhesive layer. In some embodiments, the first flame retardant agent is not the same as the second flame retardant agent.

In one embodiment, the adhesive layer contains from 0.5 to 35 wt. % of the second flame retardant agent, based on the total weight of the adhesive layer, e.g., from 1 to 35 wt. %, from 2 to 35 wt. %, from 3 to 35 wt. %, from 0.5 to 30 wt. %, from 1 to 30 wt. %, from 2 to 30 wt. %, from 3 to 30 wt. %, from 0.5 to 25 wt. %, from 1 to 25 wt. %, from 2 to 25 wt. %, from 3 to 250 wt. %, from 0.5 to 20 wt. %, from 1 to 20 wt. %, from 2 to 20 wt. %, or from 3 to 20 wt. %. In terms of lower limits, in some embodiments of the flame retardant label, the adhesive layer may comprise greater than 0.5 wt. % of the second flame retardant agent, e.g., greater than 1 wt. %, greater than 2 wt. %, or greater than 3 wt. %, based on the total weight of the adhesive layer. In terms of upper limits, in some embodiments of the flame retardant label, the adhesive layer may comprise less than 35 wt. %. of the second flame retardant agent, e.g., less than 30 wt. %., less than 25 wt. %, or less than 20 wt. %.

In one embodiment, the adhesive layer has a coat weight ranging from 5 to 50 $g/m^2$, e.g., from 5 to 45 $g/m^2$, from 5 to 40 $g/m^2$, from 5 to 35 $g/m^2$, from 5 to 30 $g/m^2$, from 8 to 50 $g/m^2$, from 8 to 45 $g/m^2$, from 8 to 40 $g/m^2$, from 8 to 35 $g/m^2$, from 8 to 30 $g/m^2$, from 10 to 50 $g/m^2$, from 10 to 45 $g/m^2$, from 10 to 40 $g/m^2$, from 10 to 35 $g/m^2$, from 10 to 30 $g/m^2$, from 12 to 50 $g/m^2$, from 12 to 45 $g/m^2$, from 12 to 40 $g/m^2$, from 12 to 35 $g/m^2$, from 12 to 30 $g/m^2$, from 15 to 50 $g/m^2$, from 15 to 45 $g/m^2$, from 15 to 40 $g/m^2$, from 15 to 35 $g/m^2$, or from 15 to 30 $g/m^2$. In terms of lower limits, the adhesive layer may have a coat weight greater than 5 $g/m^2$, e.g., greater than 8 $g/m^2$, greater than 10 $g/m^2$, greater than 12 $g/m^2$, or greater than 15 $g/m^2$. In terms of upper limits, the adhesive layer may have a coat weight less than 50 $g/m^2$, e.g., less than 45 $g/m^2$, less than 40 $g/m^2$, less than 35 $g/m^2$, or less than 30 $g/m^2$.

Liner Layer

In accordance with certain embodiments, the flame retardant label may comprise a liner layer. The liner layer may be releasable. In some embodiments, the liner layer may be positioned directly adjacent to the adhesive layer, on the opposite side of the adhesive layer from the film layer. In this regard, the liner layer may protect the adhesive layer before the flame retardant label is applied (or intended to be applied) to a substrate, e.g., an electrical device, such as during manufacture, printing, shipping, storage, and at other times. Any suitable material for a releasable liner may be used. Typical and commercially available releasable liners, which can be suitable for embodiments, can include a silicone-treated release paper or film, such as those available from Loparex, including products such as 1011, 22533 and 1 1404, CP Films, and Akrosil™.

In some embodiments, the liner layer comprises an embossed plastic paper. In some cases, the liner layer may comprise glassine, kraft paper, and/or other paper products coated with a liner polymer. For example, the liner layer may comprise glassine coated with polyethylene. In some embodiments, the liner polymer has a coat weight ranging from 5 to 50 $g/m^2$, e.g., from 5 to 45 $g/m^2$, from 5 to 40 $g/m^2$, from 5 to 35 $g/m^2$, from 5 to 30 $g/m^2$, from 8 to 50 $g/m^2$, from 8 to 45 $g/m^2$, from 8 to 40 $g/m^2$, from 8 to 35 $g/m^2$, from 8 to 30 $g/m^2$, from 10 to 50 $g/m^2$, from 10 to 45 $g/m^2$, from 10 to 40 $g/m^2$, from 10 to 35 $g/m^2$, from 10 to 30 $g/m^2$, from 12 to 50 $g/m^2$, from 12 to 45 $g/m^2$, from 12 to 40 $g/m^2$, from 12 to 35 $g/m^2$, from 12 to 30 $g/m^2$, from 15 to 50 $g/m^2$, from 15 to 45 $g/m^2$, from 15 to 40 $g/m^2$, from 15 to 35 $g/m^2$, or from 15 to 30 $g/m^2$. In terms of lower limits, the liner polymer may have a coat weight greater than 5 $g/m^2$, e.g., greater than 8 $g/m^2$, greater than 10 $g/m^2$, greater than 12 $g/m^2$, or greater than 15 $g/m^2$. In terms of upper limits, the liner polymer may have a coat weight less than 50 $g/m^2$, e.g., less than 45 $g/m^2$, less than 40 $g/m^2$, less than 35 $g/m^2$, or less than 30 $g/m^2$.

In one embodiment, the liner layer has a total coat weight ranging from 50 to 150 $g/m^2$, e.g., from 50 to 145 $g/m^2$, from 50 to 140 $g/m^2$, from 50 to 135 $g/m^2$, from 50 to 130 $g/m^2$, from 80 to 150 $g/m^2$, from 80 to 145 $g/m^2$, from 80 to 140 $g/m^2$, from 80 to 135 $g/m^2$, from 80 to 130 $g/m^2$, from 100 to 150 $g/m^2$, from 100 to 145 $g/m^2$, from 100 to 140 $g/m^2$, from 100 to 135 $g/m^2$, from 100 to 130 $g/m^2$, from 120 to 150 $g/m^2$, from 120 to 145 $g/m^2$, from 120 to 140 $g/m^2$, from 120 to 135 $g/m^2$, from 120 to 130 $g/m^2$. In terms of lower limits, the liner layer may have a total coat weight greater than 50 $g/m^2$, e.g., greater than 80 $g/m^2$, greater than 100 $g/m^2$, greater than 120 $g/m^2$. In terms of upper limits, the liner layer may have a total coat weight less than 150 $g/m^2$, e.g., less than 145 $g/m^2$, less than 140 $g/m^2$, less than 135 $g/m^2$, or less than 130 $g/m^2$.

In some embodiments, the liner layer has opposing top and bottom surfaces, with the bottom surface being the surface that faces the substrate. The arrangement of the liner layer with respect to the other layers may vary widely. In some embodiments, the liner layer contacts the adhesive layer. In some cases, the top surface of the liner layer contacts the bottom surface of the adhesive layer. In these embodiments, the liner layer may be removed from the adhesive layer before application of the flame retardant label, so that the bottom surface of the adhesive layer may then be affixed to the electrical device, e.g., battery, to be labeled.

As noted above, in some embodiments of the flame retardant label, the liner layer comprises ridges. In some cases, the top surface of the liner layer comprises ridges, so that channels in the bottom surface of the adhesive layer can be formed. In embodiments wherein the top surface of the liner layer comprises ridges and contacts the bottom surface of the adhesive layer, the ridges of the liner layer remain imprinted as channels in the bottom surface of the adhesive layer when the liner layer is removed during application. These channels may provide for air egress during application of the label to an electrical device. As discussed above, the planar design or layout of these ridges may vary widely.

The flame retardant label of the present disclosure meets the flame-retardant requirements under the UL94 VTM standards (2016). UL94 is a standard for determining the material's tendency to either extinguish or spread the flame once the specimen has been ignited. The test procedures for evaluating flame-retardant performance under the UL 94 VTM are well known, for example, as described in http://industries.ul.com/plastics-and-components/plastics/plastics-testing#ul94. Typically, to evaluate the flame-retardant performance of the labels disclosed herein, at least one set of five specimens are tested. Each specimen is burned for 3 seconds. The burning source ("burner") is then removed and the time from the removal to the time when the burning stops is recorded as T1. The specimen is then burned again for three minutes. The burning source is once again removed and the time from removal to the time when the second burning stops is recorded as T2. The VTM tests typically measure the flame retardant performance of a set of five specimen and the total flaming combustion time for each specimen; the total flaming combustion time for all 5 specimens of any set; the glowing combustion time for each specimen after second burner flame application; whether the glowing or flaming combustion of any specimen is up to holding clamp; whether the cotton placed below the sample is ignited by flaming drips from any specimen are observed and recorded.

Table 1 shows the requirement for the VTM-0, VTM-1, or VTM standard.

TABLE 1

Table 1. VTM-0, VTM-1 and VTM-2 standards
UL94 VTM Standards

| VTM test parameter | VTM-0 | VTM-1 | VTM-2 |
|---|---|---|---|
| Total flaming combustion time for each specimen (T1 + T2) | ≤10 sec | ≤30 sec | ≤30 sec |
| Total flaming combustion time for all 5 specimens of any set | ≤50 sec | ≤250 sec | ≤250 sec |
| Glowing combustion for each specimen after second burner flame application | ≤30 sec | ≤60 sec | ≤60 sec |
| Glowing or flaming combustion of any specimen up to holding clamp | NO | NO | NO |
| Whether Cotton can be ignited by flaming drips from anyspecimen | NO | NO | YES |

In some embodiments, the flammability rating of the flame retardant label satisfies the requirements of UL 94 VTM-2 standard. In other embodiments, the flammability rating of the flame retardant label satisfies the requirements of UL 94 VTM-1 standard. In some embodiments the flammability rating of the flame retardant label satisfies the requirements of UL 94 VTM-0 standard.

Performance Characteristics

The flame retardant label of the present disclosure is substantially matte as well as substantially translucent. In some embodiments, the flame retardant label is matte as a result of the channels present, e.g., in the adhesive layer. The inventors have found that the synergistic combination of air egress channels and the specific composition of the specific layers, e.g., the adhesive layer, unexpectedly provide for the desirable haze properties of the label.

The translucency of a film, e.g., of the flame retardant label, can be quantified by its haze value. The haze value describes the amount of light scattering that occurs upon shining a light through a sample of the film. In particular, the haze value indicates the percentage of transmitted light, which in passing through the specimen deviates from the incident beam by forward scattering. In one embodiment, the flame retardant label has a haze value from 5% to 80%, e.g., from 5% to 75%, from 5% to 65%, from 5% to 60%, from 10% to 80%, from 10% to 75%, from 10% to 65%, from 10% to 60%, from 15% to 80%, from 15% to 75%, from 15% to 65%, from 15% to 60%, from 20% to 80%, from 20% to 75%, from 20% to 65%, from 20% to 60%, from 25% to 80%, from 25% to 75%, from 25% to 65%, or from 25% to 60%. In terms of lower limits, the haze value of the flame retardant label may be greater than 5%, e.g., greater than 10%, greater than 15%, greater than 20%, or greater than 25%. In terms of upper limits, the haze value of the flame retardant label may be less than 80%, e.g., less than 75%, less than 70%, less than 65%, or less than 60%.

Methods of Use

The present disclosure also relates to methods for applying flame retardant labels to electrical devices. These methods comprise the steps of (i) providing a flame retardant label, comprising a coating layer, a film layer, and an adhesive layer, and (ii) affixing the flame retardant label to an electrical device. In some cases, the electrical device is a battery.

In some embodiments, the flame retardant label may further comprise a liner layer, which may be in contact with the adhesive layer. In these embodiments, the method further comprises the step of the removing the liner layer. By removing the liner layer, the adhesive layer can be exposed and thereafter affixed to the electrical device to be labeled. As noted above, the liner layer may comprise ridges, and the ridges may create channels in the adhesive layer that remain on removal of the liner layer. These channels provide for air egress during application of the label to an electrical device. For example, a user may release any air trapped under the flame retardant label by applying pressure to an outer surface of the flame retardant label, e.g., to the top surface of the coating layer. The trapped air may flow through the channels in the adhesive layer and be released from under the label.

EXAMPLES

Flame retardant labels were prepared as follows. Each flame retardant label contained, from top to bottom, a coating layer, a PET film layer, an adhesive layer, and a liner.

In all prepared flame retardant labels, the coating layer was formed from a polyester resin, a flame retardant comprising Exolit OP 935, an isocyanate crosslinker, wetting agents, and, as solvents, MIBK and toluene. The coating layer had a thickness of about 10 μm. The formulation of the coating layer is shown in Table 2.

The PET film layer had thickness of about 25 μm.

Two formulations of the adhesive layer were prepared. Each adhesive layer was formed from a hydroxyl group substituted acrylic polymer resin, tackifier, Exolit OP 935, epoxy resin, and, as solvents, MIBK and toluene. Each adhesive layer had a coat weight of about 20-30 grams per square meter. The formulations of the adhesive are shown in Table 3.

The flame retardant labels were prepared using one of two types of liner layers: polyethylene-coated glassine with ridges, or polyethylene-coated glassine without ridges.

TABLE 2

Formulation of Coating Layer

| Component | Material | Weight Percent (based on total coating layer) |
|---|---|---|
| First base polymer | Uralac ® SN862 (DSM) | 38.07% |
| First flame retardant agent | Exolit OP 935 (Clariant) | 38.07% |
| First crosslinker | N75 (Covestro) | 17.77% |
| Wetting agent | BYK-170 (BYK) | 2.54% |
| Wetting agent | BYK 3550 (BYK) | 0.25% |
| Crosslinker catalyst | K-KAT 348 (King Industry) | 1.27% |
| Solvent | MIBK | — |
| Solvent | Toluene | — |

TABLE 3

Formulation of Adhesive Layer

| Component | Material | Weight Percent (based on total adhesive layer) | |
|---|---|---|---|
| | | Formulation 1 | Formulation 2 |
| Second base polymer | Etrac 7043 (Eternal) | 76.92% | 76.92% |
| Tackier | GA-100 (Arakawa) | 18.46% | 18.46% |
| Second flame retardant agent | Exolit OP 935 (Clariant) | 4.5% | 1.5% |
| Wetting agent | NPSN-134X80 (Nanya) | 1.54% | 1.54% |
| Solvent | MIBK | — | — |
| Solvent | Toluene | — | — |

The prepared flame retardant label was subjected to a number of tests. These tests include a visual inspection and rating of the label appearance on a scale of 1-5, with 5 being the most preferred. These tests also measured haze value, 180° peel strength, and flame retardancy. Results of these tests are shown in Table 4.

TABLE 4

Test Data of Prepared Flame Retardant Label

| Test | Adhesive 1; Ridged Liner | Adhesive 2; Ridged Liner | Adhesive 1, Non-Ridged Liner |
|---|---|---|---|
| Labeling Appearance | 5 | 5 | 3 |
| Haze Value | 65 | 65 | 45 |
| 180° Peel Strength (20 min) | 7 N/Inch | 9 N/Inch | 10 N/Inch |
| UL-94 Test | VTM-0 | VTM-1 | VTM-0 |

As shown in Table 4, the labels prepared as disclosed herein demonstrate an unexpected combination of performance features. Specifically, the particular layer compositions, and in some cases, the formation of air egress channels therein, provides for excellent label appearance in addition to preferred haze performance. In addition the labels have excellent peel strength and flame retardancy.

EMBODIMENTS

The following embodiments are contemplated. All combinations of features and embodiments are contemplated.

Embodiment 1: A flame retardant label, comprising: a coating layer, comprising a first base polymer, a first crosslinker, and a first flame retardant agent; a film layer; and an adhesive layer, comprising a second base polymer, a second flame retardant agent, a tackifier, and a second crosslinker.

Embodiment 2: The flame retardant label of embodiment 1, wherein the adhesive layer is in contact with at least a portion of the film layer.

Embodiment 3: The flame retardant label of any of the preceding embodiments, wherein each of the coating layer, the film layer, and the adhesive layer comprises a top surface and a bottom surface.

Embodiment 4: The flame retardant label of any of the preceding embodiments, wherein the adhesive layer defines channels for air egress.

Embodiment 5: The flame retardant label of embodiment 4, wherein the channels are arranged as tessellating rhombuses.

Embodiment 6: The flame retardant label of any of the preceding embodiments, wherein the flame retardant label has a haze value from 5 to 80.

Embodiment 7: The flame retardant label of any of the preceding embodiments, wherein the first base polymer comprises a polyester, polyacrylate, or combinations thereof.

Embodiment 8: The flame retardant label of any of the preceding embodiments, wherein the coating layer comprises a polyester, polyacrylate, or combinations thereof in an amount ranging from 20 wt. % to 60 wt. %.

Embodiment 9: The flame retardant label of any of the preceding embodiments, wherein the first base polymer has a hydroxyl value greater than 100 mgKOH/g.

Embodiment 10: The flame retardant label of any of the preceding embodiments, wherein the second base polymer comprises a polyester, polyacrylate, or combinations thereof.

Embodiment 11: The flame retardant label of any of the preceding embodiments, wherein the second base polymer has a hydroxyl value less than 100 mgKOH/g.

Embodiment 12: The flame retardant label of any of the preceding embodiments, wherein the second base polymer has an acid value less than 100 mgKOH/g.

Embodiment 13: The flame retardant label of any of the preceding embodiments, wherein the second base polymer has a glass transition temperature ranging from −50° C. to 10° C.

Embodiment 14: The flame retardant label of any of the preceding embodiments, wherein the weight ratio of the tackifier in the adhesive layer to the second base polymer is from 1:10 to 1.5:1.

Embodiment 15: The flame retardant label of any of the preceding embodiments, wherein the first crosslinker comprises isocyanate.

Embodiment 16: The flame retardant label of any of the preceding embodiments, wherein the first flame retardant agent comprises organic phosphinates.

Embodiment 17: The flame retardant label of any of the preceding embodiments, wherein the second flame retardant agent comprises organic phosphinates.

Embodiment 18: The flame retardant label of any of the preceding embodiments, wherein the tackifier in the adhesive layer has an average softening point below 125° C.

Embodiment 19: The flame retardant label of any of the preceding embodiments, wherein the tackifier in the adhesive layer comprises a rosin, a terpene, or derivatives thereof, or combinations thereof.

Embodiment 20: The flame retardant label of any of the preceding embodiments, wherein the second crosslinker comprises isocyanate, epoxy, or combinations thereof.

Embodiment 21: The flame retardant label of any of the preceding embodiments, wherein the film layer comprises one or more resins selected from the group consisting of polyester, ABS, polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PEI), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, DIALAMY (polymer alloys), polyethylene naphthalate (PEN), ethylene/tetrafluoroethylene (E/TFE), polyphenyl sulfone (PPSU).

Embodiment 22: The flame retardant label of any of the preceding embodiments, wherein the thickness of the coating layer is from 1 to 30 μm.

Embodiment 23: The flame retardant label of any of the preceding embodiments, wherein the thickness of the film layer is from 10 to 60 μm.

Embodiment 24: The flame retardant label of any of the preceding embodiments, wherein the coat weight of the adhesive layer is from 5 to 50 g/m².

Embodiment 25: The flame retardant label of any of the preceding embodiments, wherein the flammability rating of the flame retardant label satisfies VTM-0.

Embodiment 26: The flame retardant label of any of the preceding embodiments, wherein the bottom surface is the surface facing an object to be labeled and the top surface is the surface on the opposite side of the bottom surface.

Embodiment 27: The flame retardant label of any of the preceding embodiments, wherein the flame retardant label further comprises a liner layer that contacts the bottom surface of the adhesive layer.

Embodiment 28: The flame retardant label of embodiment 27, wherein the coat weight of the liner layer is from 50 to 150 g/m².

Embodiment 29: The flame retardant label of embodiment 27 or 28, wherein the liner layer comprises an embossed plastic paper.

Embodiment 30: The flame retardant label of any of embodiments 27-29, wherein the liner layer comprises glassine coated with a liner polymer.

Embodiment 31: The flame retardant label of embodiment 30, wherein the coat weight of the liner polymer is from 5 to 50 g/m².

Embodiment 32: The flame retardant label of any of the preceding embodiments, wherein the coating layer comprises a polyester in an amount ranging from 25 wt. % to 40 wt. %; wherein the first base polymer has a hydroxyl value greater than 100 mgKOH/g; wherein the second base polymer has a hydroxyl value less than 80 mgKOH/g and an acid value less than 35 mgKOH/g; wherein the second base polymer has a glass transition temperature ranging from −40° C. to 0° C.; and wherein the flammability rating of the flame retardant label satisfies VTM-0.

Embodiment 33: The flame retardant label of any of the preceding embodiments, wherein the thickness of the coating layer is 5 to 15 μm, the thickness of the film layer is 20 to 30 μm, and the coat weight of the adhesive layer is 15 to 25 g/m².

Embodiment 34: The flame retardant label of any of the preceding embodiments, wherein the first crosslinker comprises isocyanate; the first flame retardant agent comprises an organic phosphinate; the second flame retardant agent comprises an organic phosphinate; the tackifier comprises a terpene or a rosin; and the second crosslinker comprises isocyanate or epoxy.

Embodiment 35: The flame retardant label of any of the preceding embodiments, wherein the first crosslinker comprises isocyanate; the first flame retardant agent comprises an organic phosphinate; the second flame retardant agent comprises an organic phosphinate; the tackifier comprises a terpene or a rosin; the second crosslinker comprises isocyanate or epoxy; and wherein the flammability rating of the flame retardant label satisfies VTM-0.

Embodiment 36: The flame retardant label of any of the preceding embodiments, wherein the flame retardant label is affixed to a battery surface or a battery wrapping.

Embodiment 37: A method of labeling a battery comprising the steps of providing a flame retardant label, comprising a coating layer, comprising a first base polymer, an isocyanate crosslinker, and a first flame retardant agent; a film layer; and an adhesive layer, comprising a second base polymer, a second flame retardant agent, a tackifier, and a second crosslinker; and affixing the flame retardant label to a battery surface or a battery wrapping.

We claim:

1. A flame retardant label, comprising:
   a coating layer, comprising a first base polymer, a first crosslinker, and a first flame retardant agent, wherein the first base polymer is a polyester;
   a film layer; and
   an adhesive layer, comprising a second base polymer, a second flame retardant agent, a tackifier, and a second crosslinker.

2. The flame retardant label of claim 1, wherein the adhesive layer is in contact with at least a portion of the film layer.

3. The flame retardant label of claim 1, wherein each of the coating layer, the film layer, and the adhesive layer comprises a top surface and a bottom surface.

4. The flame retardant label of claim 1, wherein the adhesive layer defines channels for air egress.

5. The flame retardant label of claim 4, wherein the channels are arranged as tessellating rhombuses.

6. The flame retardant label of claim 1, wherein the flame retardant label has a haze value from 5 to 80.

7. The flame retardant label of claim 1, wherein the first base polymer has a hydroxyl value greater than 100 mgKOH/g.

8. The flame retardant label of claim 1, wherein the second base polymer comprises a polyester, polyacrylate, or combinations thereof.

9. The flame retardant label of claim 1, wherein the second base polymer has a hydroxyl value less than 100 mgKOH/g.

10. The flame retardant label of claim 1, wherein the second base polymer has an acid value less than 100 mgKOH/g.

11. The flame retardant label of claim 1, wherein the second base polymer has a glass transition temperature ranging from −50° C. to 10° C.

12. The flame retardant label of claim 1, wherein the weight ratio of the tackifier in the adhesive layer to the second base polymer is from 1:10 to 1.5:1.

13. The flame retardant label of claim 1, wherein the first crosslinker comprises isocyanate.

14. The flame retardant label of claim 1, wherein the first flame retardant agent comprises organic phosphinates.

15. The flame retardant label of claim 1, wherein the second flame retardant agent comprises organic phosphinates.

16. The flame retardant label of claim 1, wherein the tackifier in the adhesive layer has an average softening point below 125° C.

17. The flame retardant label of claim 1, wherein the tackifier in the adhesive layer comprises a rosin, a terpene, coumarone, or derivatives thereof, or combinations thereof.

18. The flame retardant label of claim 1, wherein the second crosslinker comprises isocyanate, epoxy, or combinations thereof.

19. The flame retardant label of claim 1, wherein the film layer comprises one or more resins selected from the group consisting of polyester, ABS, polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PEI), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, polyethylene naphthalate (PEN), ethylene/tetrafluoroethylene (E/TFE), polyphenyl sulfone (PPSU).

20. The flame retardant label of claim 1, wherein the thickness of the coating layer is from 1 to 30 μm.

21. The flame retardant label of claim 1, wherein the thickness of the film layer is from 10 to 60 μm.

22. The flame retardant label of claim 1, wherein the coat weight of the adhesive layer is from 5 to 50 g/m2.

23. The flame retardant label of claim 1, wherein the flammability rating of the flame retardant label satisfies VTM-0.

24. The flame retardant label of claim 1, wherein the bottom surface is the surface facing an object to be labeled and the top surface is the surface on the opposite side of the bottom surface.

25. The flame retardant label of claim 1, wherein the flame retardant label further comprises a liner layer that contacts the bottom surface of the adhesive layer.

26. The flame retardant label of claim 25, wherein the liner layer comprises an embossed plastic paper.

27. The flame retardant label of claim 25, wherein the liner layer comprises glassine, kraft paper or other papers coated with a liner polymer.

28. The flame retardant label of claim 1, wherein the coating layer comprises a polyester in an amount ranging from 25 wt. % to 40 wt. %; wherein the first base polymer has a hydroxyl value greater than 100 mgKOH/g; wherein the second base polymer has a hydroxyl value less than 80 mgKOH/g and an acid value less than 35 mgKOH/g; wherein the second base polymer has a glass transition temperature ranging from −40° C. to 0° C.; and wherein the flammability rating of the flame retardant label satisfies VTM-0.

29. The flame retardant label of claim 1, wherein the thickness of the coating layer is 5 to 15 μm, the thickness of the film layer is 20 to 30 μm, and the coat weight of the adhesive layer is 15 to 25 g/m2.

30. The flame retardant label of claim 1, wherein the first crosslinker comprises isocyanate; the first flame retardant agent comprises an organic phosphinate; the second flame retardant agent comprises an organic phosphinate; the tackifier comprises a terpene or a rosin; and the second crosslinker comprises isocyanate or epoxy.

31. The flame retardant label of claim 1, wherein the first crosslinker comprises isocyanate; the first flame retardant agent comprises an organic phosphinate; the second flame retardant agent comprises an organic phosphinate; the tackifier comprises a terpene or a rosin; the second crosslinker comprises isocyanate or epoxy; and wherein the flammability rating of the flame retardant label satisfies VTM-0.

32. The flame retardant label of claim 1, wherein the flame retardant label is affixed to a battery surface or a battery wrapping.

* * * * *